US008850072B1

(12) United States Patent
Roberts et al.

(10) Patent No.: US 8,850,072 B1
(45) Date of Patent: Sep. 30, 2014

(54) SECURE COMMUNICATION NETWORK

(71) Applicant: KE2 Therm Solutions, Inc., Washington, MO (US)

(72) Inventors: Steve Roberts, Washington, MO (US); Cetin Sert, Heidelberg (DE)

(73) Assignee: KE2 Therm Solutions, Inc., Washington, MO (US)

( * ) Notice: Subject to any disclaimer, the term of this patent is extended or adjusted under 35 U.S.C. 154(b) by 0 days.

(21) Appl. No.: 13/950,365

(22) Filed: Jul. 25, 2013

(51) Int. Cl.
*G06F 15/16* (2006.01)
*H04L 12/24* (2006.01)
*H04N 21/4367* (2011.01)
*H04N 21/258* (2011.01)
*H04L 12/28* (2006.01)

(52) U.S. Cl.
CPC ............ *H04L 41/28* (2013.01); *H04N 21/4367* (2013.01); *H04N 21/25875* (2013.01); *H04L 12/287* (2013.01)
USPC ............... 709/246; 709/203; 709/223; 700/3; 700/90; 704/275; 704/E15.001; 713/176

(58) Field of Classification Search
CPC ..... H04L 41/28; H04L 41/046; H04L 12/287; H04N 21/25875; H04N 21/4367
USPC .................................................. 709/246, 223
See application file for complete search history.

(56) References Cited

U.S. PATENT DOCUMENTS

| 6,466,571 B1 * | 10/2002 | Dynarski et al. ............... 370/352 |
| 2004/0068657 A1 * | 4/2004 | Alexander et al. ............ 713/176 |
| 2008/0134290 A1 * | 6/2008 | Olsson ............................... 726/3 |
| 2009/0271002 A1 * | 10/2009 | Asofsky ............................ 700/3 |

| 2013/0091193 A1 * | 4/2013 | Nachtrab et al. ............... 709/202 |

OTHER PUBLICATIONS

Google Patent Search.*
Wikipedia, "Tunneling Protocol", downloaded from the Internet at https://en.wikipedia.org/wiki/Tunneling_protocol on Oct. 25, 2013 (3 pgs).
"Open SSH Keeping Your Communiqués Secret", downloaded from the Internet at http://www.openssh.com/ on Oct. 25, 2013, copyright 1999-2009, Open BSD (1 pg.).
"stunnel: Home", downloaded from the Internet at https://www.stunnel.org/index.html on Oct. 25, 2013. (1 pg.).
"HTTPTunnel v.1.2.1", downloaded from the Internet at http://http-tunnel.sourceforge.net/ on Oct. 25, 2013. (2 pgs.).
"Lantronix® SLB", downloaded from the Internet at www.lantronix.com/it-management/branch-office/slb.html on Dec. 11, 2013. (2 pgs.).
"n2n a Layer Two Peer-to-Peer VPN", downloaded from the Internet at http://www.ntop.org/products/n2n/ on Dec. 11, 2013. (5 pgs).

(Continued)

*Primary Examiner* — Arvin Eskandarnia
(74) *Attorney, Agent, or Firm* — Stinson Leonard Street LLP

(57) ABSTRACT

The present invention is directed to a secure communication network that enables multi-point to multi-point proxy communication over the network. The network employs a smart server that establishes a secure communication link with each of a plurality of smart client devices installed on local client networks. Each smart client device is in communication with a plurality of agent devices. A plurality of remote devices can access the smart server directly and communicate with agent devices via the secure communication link between the smart server and one of the smart client devices. This communication is enabled without complex configuration of firewall or network parameters by the user.

24 Claims, 6 Drawing Sheets

(56) References Cited

OTHER PUBLICATIONS

"PortFusion", downloaded from the Internet at https://github.com/corsis/PortFusion on Oct. 25, 2013. (5 pgs.).

"DeleGate as a Man-In-The-Middle proxy", downloaded from the Internet at http://delegate.org/delegate/mitm/ on Dec. 11, 2013. (2 pgs.).

"Punching Holes into Firewalls", downloaded from the Internet at http://sebsauvage.net/punching/ on Oct. 25, 2013. (6 pgs.).

Christie, Saul, "How to Bypass Any Firewall", previously downloaded from the Internet but no longer available on the web, Nov. 11, 2011. (8 pgs.).

"How to Bypass Most Firewall Restrictions and Access the Internet Privately aka The Surf at Work Page, Version 2.1", previously downloaded from the Internet but no longer available on the web, Created Oct. 25, 2002, Updated Sep. 28, 2008. (8 pgs.).

\* cited by examiner

SECURE COMMUNICATION NETWORK

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention is directed generally to computer networks, and more specifically to a secure communication network that enables multi-point to multi-point communication between computing devices.

2. Description of Related Art

Computer networks and the exchange of data between networked computing devices are well known in the art. Examples of common communication protocols include User Datagram Protocol (UDP), Internet Protocol (IP), Transmission Control Protocol (TCP), Hypertext Transfer Protocol (HTTP), and File Transfer Protocol (FTP) to name a few. Many private computer networks, such as a local area network (LAN), provide access to the Internet or other public networks to enable communication outside of the private computer network. Further, many businesses establish a virtual private network (VPN) so that off-site employees can securely access their company's private network as if directly connected to that network. While this extended connectivity is useful and desirable, it raises issues of data security and access to private computer networks by unauthorized users.

To address these security concerns, private computer networks that provide access to the Internet may employ numerous security measures. These measures may include the use of authentication credentials (e.g., account names and passwords), the use of a firewall designed to prevent unauthorized access to a computer network, and the use of cryptographic protocols that provide communication security over the Internet. While all of these measures either alone or in combination address security concerns, they are not without drawbacks.

For example, many of these security measures require configuration of the computing devices on the private computer network and/or configuration of the network's firewall. While this configuration is routine for IT professionals, it is complicated or impossible for many users that do not have knowledge of network architecture. As a result, users must hire expert assistance to configure their private computer network or forego security entirely. Furthermore, the implementation and management of communication capabilities on the private computer network typically requires the use of one or several dedicated network devices, which can be relatively large and expensive to operate and maintain.

Thus, there remains a need in the art for a secure communication network that enables remote access to computing devices located within a private computer network without requiring complex configuration of the network or knowledge of network architecture.

BRIEF SUMMARY OF THE INVENTION

The present invention is directed to a secure communication network that enables a plurality of remote devices to securely access a plurality of computing devices located within a local client network. Each of the computing devices is referred to herein as an agent device. An agent device may comprise any IP (Internet Protocol) capable device, e.g., laptop computer, tablet, desktop computer, printer, storage device, or specialized control device, such as a controller for an embedded control system. The control system may comprise any embedded control environment. Exemplary control systems include heating, ventilation, air conditioning and refrigeration (HVAC&R) systems, energy management systems, building automation systems, automotive and transportation systems, lighting control systems, security systems, surveillance systems, IP cameras and kiosks.

In accordance with the invention, the secure communication network includes a smart client device deployed within the client network that communicates with each of the agent devices within the network. The smart client device also communicates over a secure communication link with a smart server located outside the client network. With such communication established, each remote device can access the smart server directly over an Internet connection and, if the remote device is properly authenticated, the smart server forwards port/application specific device communications from the remote device to the appropriate agent device via the established secure communication link.

While the exemplary embodiment includes a single client network, the secure communication network of the present invention can support a plurality of client networks each of which includes a smart client device in communication with a plurality of agent devices. In this case, a secure communication link is established between the smart server and each of the smart client devices. Then, as just discussed, the smart server forwards port/application specific device communications from a remote device (if properly authenticated) to the appropriate agent device of the appropriate client network via the appropriate secure communication link.

Advantageously, the secure communication network of the present invention enables multi-point to multi-point communication between devices without knowledge of routing protocols or configuration of network parameters. In addition, the secure communication network preferably employs standard data link layer communication protocols to establish secure communication through existing network firewalls without configuration of the firewall. Further, the smart client device is preferably implemented in a small-profile, inexpensive hardware package operable to plug into an existing client network and establish a secure communication link with the smart server without complex configuration of the network.

BRIEF DESCRIPTION OF THE DRAWINGS

An exemplary embodiment of the present invention is described in detail below with reference to the attached drawing figures, wherein.

DETAILED DESCRIPTION OF EXEMPLARY EMBODIMENT

The present invention is directed to a secure communication network that enables a plurality of remote devices to securely access a plurality of computing devices located within a client network. While the invention will be described in detail below with reference to an exemplary embodiment in which remote users access controllers for an embedded control system, it should be understood that the invention is not limited to this particular application and may be used to support any multi-point to multi-point communication network. In addition, although the exemplary embodiment is described as embodying several different inventive features, one skilled in the art will appreciate that any one of these features could be implemented without the others in accordance with the invention.

Figure 1:
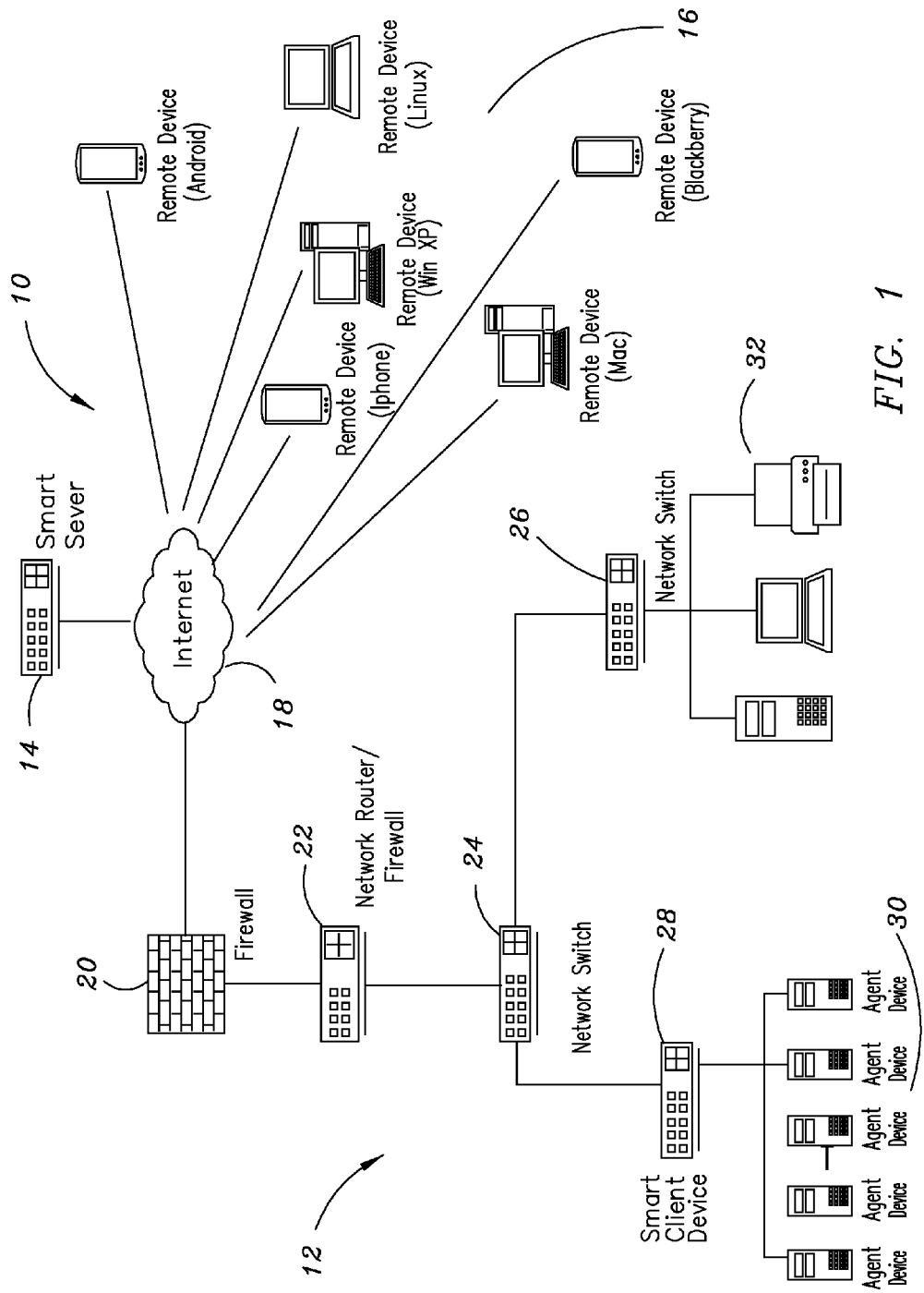
FIG. 1 is a diagram of a secure communication network in accordance with an exemplary embodiment of the present invention.

Referring to FIG. 1, a secure communication network in accordance with an exemplary embodiment of the present invention is shown generally as reference numeral 10. In general, network 10 includes a local client network 12, a smart server 14 (wherein the server will be described in greater detail below), and a plurality of remote devices 16—each of which is in communication with the Internet 18 or any other wide area network (which ultimately has an Internet connection). In accordance with the invention, remote devices 16 can securely communicate with devices within client network 12 as described below.

Client network 12 includes a firewall 20 connected to a network router 22, which is in turn connected to network switches 24 and 26. Firewall 20, network router 22, and network switches 24 and 26 are off-the-shelf devices that preferably communicate using a standard data link layer protocol, as is known in the art. Network switch 24 is connected to a smart client device 28 (wherein the client device will be described in greater detail below), which is in turn connected to a plurality of agent devices 30. Each of agent devices 30 may comprise any IP (Internet Protocol) capable device, e.g., laptop computer, tablet, desktop computer, printer, storage device, or specialized control device, such as a controller for an embedded control system. The control system may comprise any embedded control environment. Exemplary control systems include heating, ventilation, air conditioning and refrigeration (HVAC&R) systems, energy management systems, building automation systems, automotive and transportation systems, lighting control systems, security systems, surveillance systems, IP cameras and kiosks. Network switch 26 is connected to a plurality of other computing devices 32 (e.g., computers or peripheral devices) that are not agents of smart client device 28.

While a single client network 12 is shown in FIG. 1, it should be understood that network 10 can support a plurality of client networks each of which includes a smart client device (similar to smart client device 28) in communication with a plurality of agent devices (similar to agent devices 30), as well as other network devices known in the art.

Smart server 14 is assigned a public IP address and a DNS name to enable access by remote devices 16. Each of remote devices 16 may comprise any type of computing or communication device known in the art that is operable to access the Internet 18 via a wired, wireless, cellular or satellite connection. Preferably, each of remote devices 16 is capable of hosting an HTML compliant browser application or equivalent program that can be used to connect with smart server 14 using either its public IP address or DNS name. Exemplary remote devices that are suitable for use with the present invention include smart phones (e.g., iPhone, Android and Blackberry devices) and computers/tablets that run on any type of operating system (e.g., Mac, Linux, Android or Windows). As will be described below, remote devices 16 can communicate with agent devices 30 via a secure communication link established between smart server 14 and smart client device 28 without knowledge of communication protocols and without configuration of network or firewall parameters.

The smart client device 28 and smart server 14, which together enable implementation of the present invention, will be described in detail below.

Smart Client Device

In the exemplary embodiment, smart client device 28 preferably includes a microprocessor programmed to perform the methods described below in connection with FIGS. 2-4. The microprocessor is in communication with circuitry operable to implement communication using data link layer protocols. Smart client device 28 also includes non-volatile memory for storing custom software, operating parameters and device configuration settings, as well as random access memory (RAM) for storing communication information and other run-time parameters. Preferably, the microprocessor, circuitry, non-volatile memory and RAM of smart client device 28 are implemented in a small-profile, inexpensive hardware package operable to plug into an existing client network. Alternatively, smart client device 28 may comprise custom software running on off-the-shelf router hardware. In the exemplary embodiment, smart client device 28 is an embedded IP (Internet Protocol) capable device, for example, the MikroTik RB450G (with a 680 MHz processor, 256 MB Ram, 5 Gigabit Ethernet Ports, 1 microSD slot, 1 PoE (10-28 volt)), with custom software running a Linux operating system in an OpenWRT environment.

Smart client device 28 includes a plurality of ports for communication with other devices. At least one port is an Internet accessible port configured to connect for communication outside of client network 12. In this embodiment, the Internet accessible port is configured to connect via dynamic host configuration protocol (DHCP). Also, one or more ports of smart client device 28 are configured to connect to a computing device that enables management of the device. In addition, a plurality of ports of smart client device 28 are configured to connect to agent devices 30 located within client network 12. Most preferably, the ports of smart client device 28 include standard Ethernet connectors. Alternatively, the smart client device may include wireless communication circuitry that enables wireless connections to specific devices.

The custom software running on smart client device 28 is preferably operable to perform the following functions: deployment (i.e., initial setup of the smart client device), port scanning (i.e., discovering/detecting available agent devices 30 connected in the client network 12), server connection (i.e., establishing communication with smart server 14), and communication (i.e., communication with agent devices 30 and smart server 14), as well as any other support functionality. Each of these functional capabilities will now be described in more detail with reference to an exemplary operation of smart client device 28.

Figure 2:
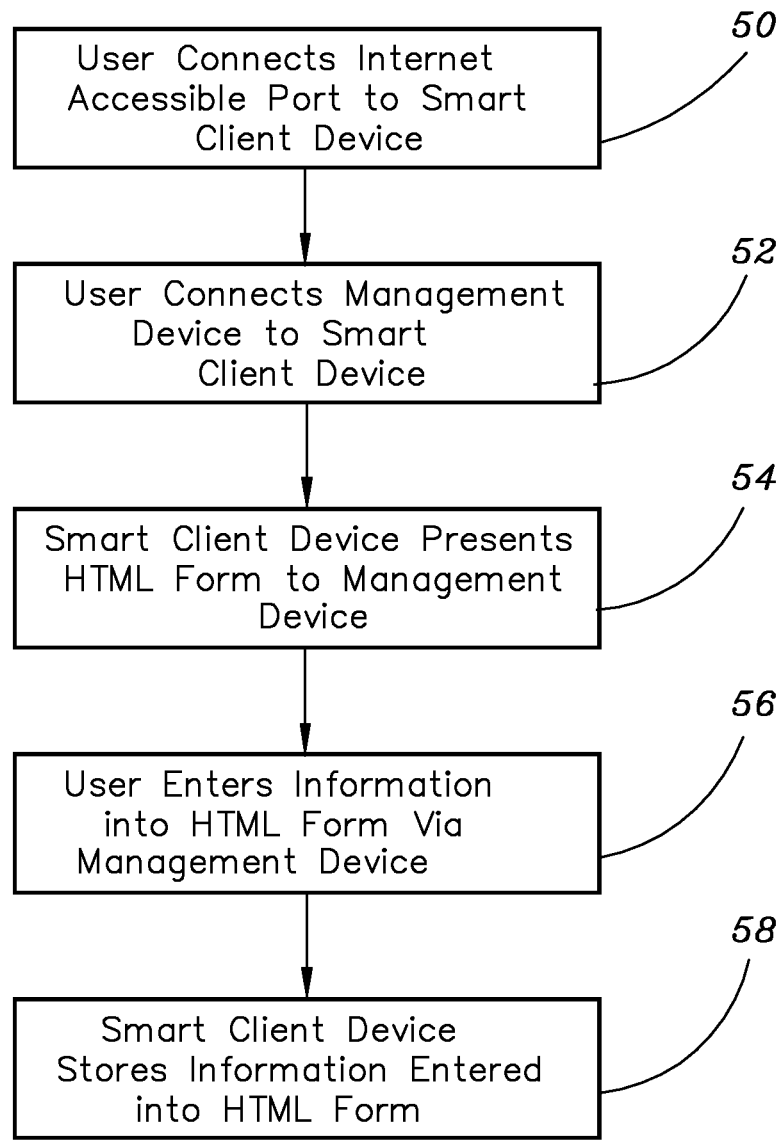
FIG. 2 is a flow diagram of an exemplary method of deploying a smart client device in a client network in accordance with the present invention.

Referring to FIG. 2, an exemplary method of deploying smart client device 28 in client network 12 is described with reference to steps 50-58. First, at step 50, a user connects a designated Internet accessible port of smart client device 28 to client network 12. At step 52, the user connects a computing device, such as a workstation, laptop computer, tablet, or smart phone, to a port of smart client device 28. As will be seen, this computing device provides management of smart client device 28 and is hereinafter referred to as a management device. Upon detection of the management device, smart client device 28 assigns the management device a management local IP address. The user then opens the management device's browser directed to the smart client device's IP address or device name.

At step 54, smart client device 28 presents an HTML form to the user on the management device. The information in the HTML form includes: an identity of smart client device 28 (pre-defined at the factory using the format xxxxx.domainname.com), a password (user-defined), agent ports (user-defined port numbers of agent devices 30), the IP address or DNS name of smart server 14, the status of smart client device 28 (connected/not connected), and a list of exceptions (user-defined to denote any agent devices 30 that should be ignored). At step 56, the user enters the required information into the HTML form and clicks a "Save" button to save the entered information. At step 58, smart client device 28 stores the information in non-volatile memory upon the user's selection of the "Save" button. Once smart client device 28 has been deployed (as just described), it is ready for operation.

Figure 3:
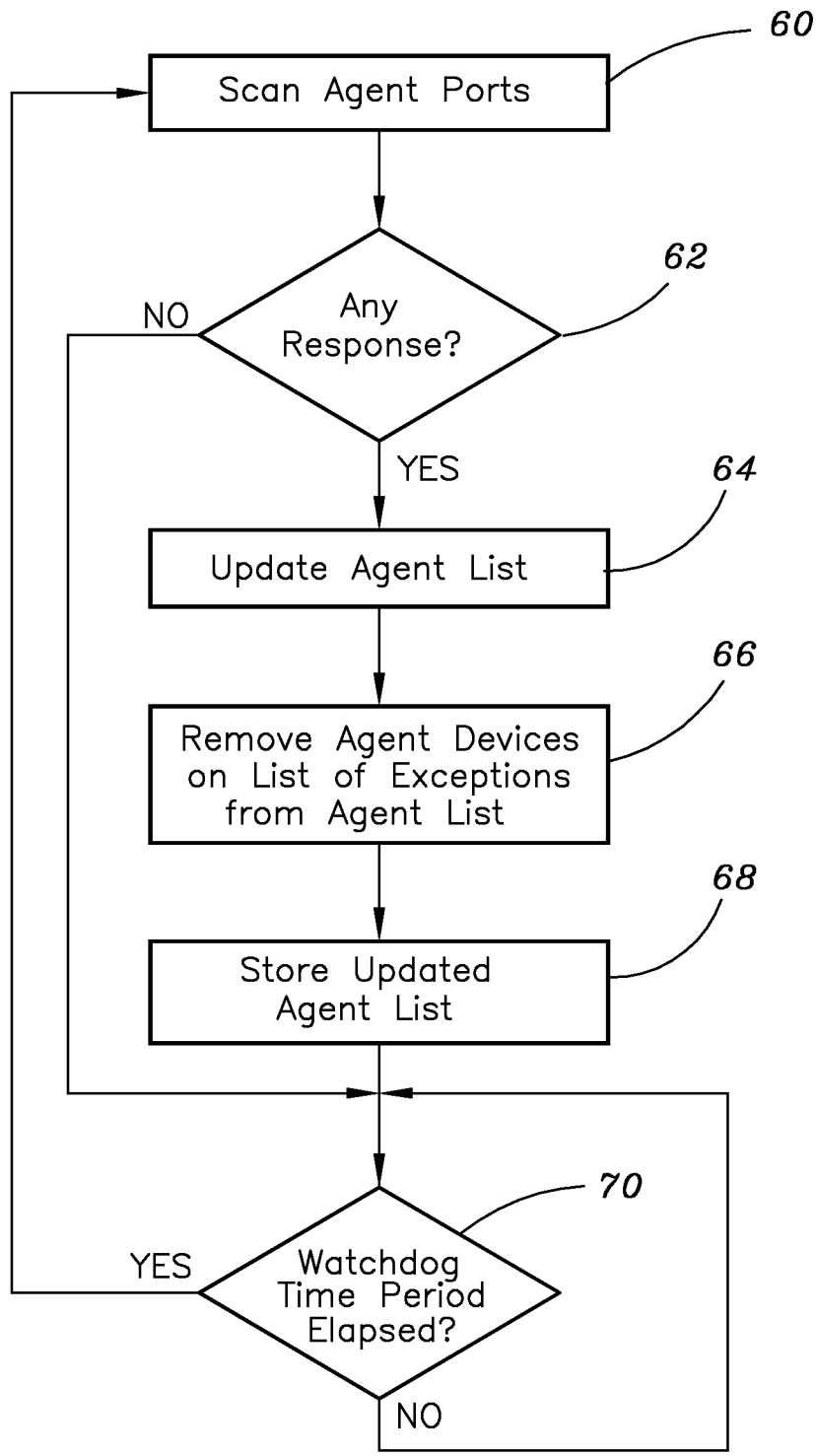
FIG. 3 is a flow diagram an exemplary method in which a smart client device establishes a list of agent devices for a client network in accordance with the present invention.

Referring to FIG. 3, an exemplary method in which smart client device 28 establishes and maintains a list of agent devices 30 for client network 12 is described with reference to steps 60-70. At step 60, smart client device 28 scans the agent ports that were entered by the user in the HTML form during deployment of smart client device 28 to look for agent devices 30 that are published on the local network. At step 62, smart client device determines if any agent devices 30 on the agent ports have responded to smart client device 28 by acknowledging the scan. If not, the method proceeds to the watchdog process of step 70 (described below). Otherwise, at step 64, upon receipt of an acknowledgement by one or more agent devices 30, smart client device 28 adds the IP addresses of the agent devices 30 to an agent list maintained by smart client device 28. At step 66, smart client device 28 compares the agent list to the list of exceptions that were entered by the user in the HTML form during deployment of smart client device 28. Any agent device identified on the list of exceptions is not processed by smart client device 28 and, thus, no further communication with that agent device will occur. Smart client device 28 then stores the updated agent list in non-volatile memory at step 68. Preferably, smart client device 28 is capable of supporting fifty (50) or more agent devices simultaneously.

At step 70, smart client device 28 periodically performs a watchdog process using a time period specified in the custom software (although the time period could alternatively be user-configurable). In the exemplary embodiment, the watchdog process is performed every 10 seconds. Each time the watchdog process is performed, steps 60-68 described above are performed so as to add any newly detected agent devices to the agent list and remove any agent devices previously on the agent list that are not responding to the scan. Also, any agent device identified on the list of exceptions is not processed by smart client device 28. Accordingly, the agent list is updated every 10 seconds.

Figure 4:
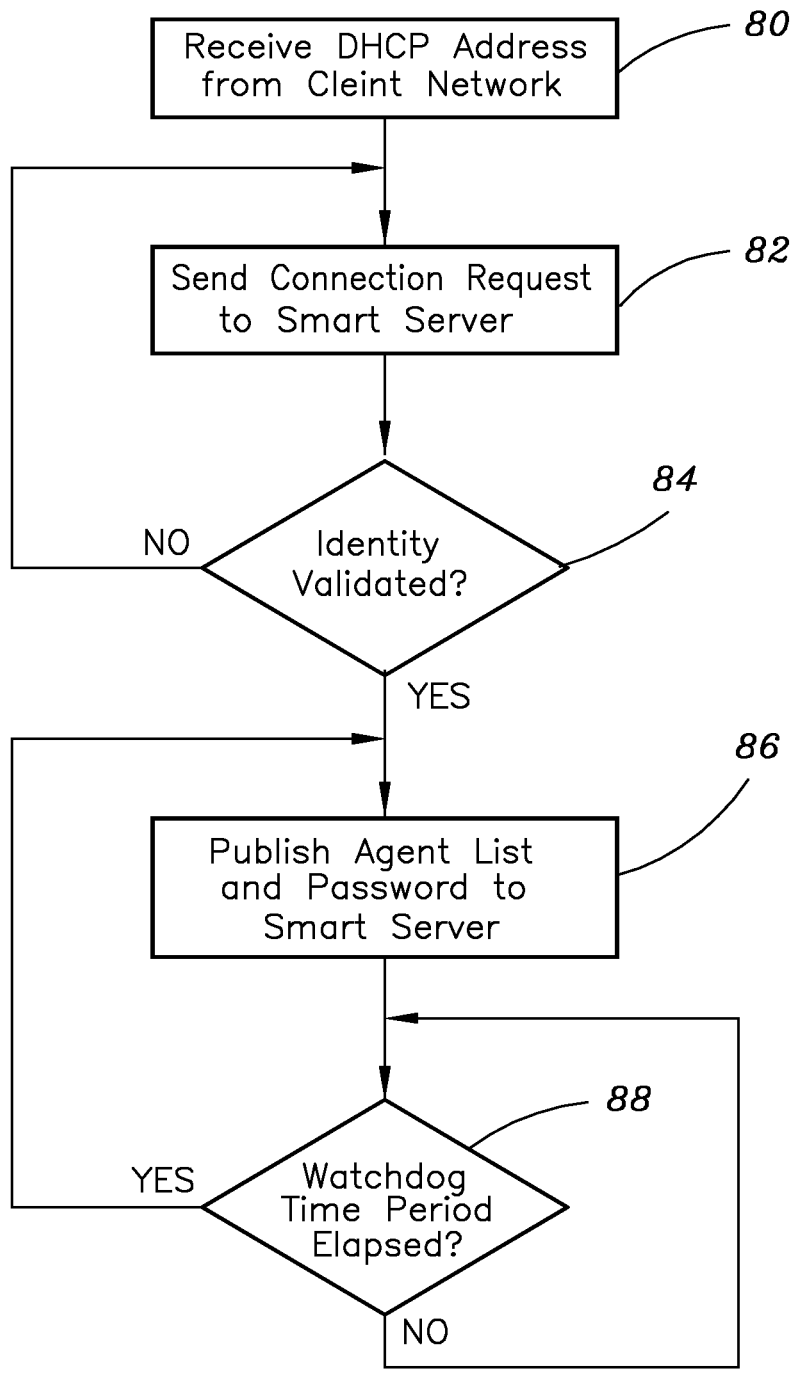
FIG. 4 is a flow diagram of an exemplary method in which a smart client device establishes a secure communication link with a smart server in accordance with the present invention.

Referring to FIG. 4, an exemplary method in which smart client device 28 establishes a secure communication link with smart server 14 is described with reference to steps 80-88. At step 80, when smart client device 28 is connected within client network 12 via the Internet accessible port as described above, smart client device 28 will be detected by network router 22 (or any other DHCP network management device on client network 12) and will be assigned a DHCP address (i.e., a local IP address) by network router 22, as is known in the art. At step 82, once active on client network 12, smart client device 28 sends a connection request that includes the identity of smart client device 28 (pre-defined at the factory) to smart server 14. This connection request is sent to the IP address or DNS name of smart server 14 that was entered by the user in the HTML form during deployment of smart client device 28. Smart client device 28 uses an outbound Secure Sockets Layer (SSL) connection over port 443 (the port generally associated with secure Internet traffic and generally open in standard network configurations). If that attempt fails, another SSL attempt is made over port 80. Additional attempts over other non-standard ports (i.e., ports 21, 22, 8080) are then performed if a connection is not made.

In step 84, if the identity of smart client device 28 is validated by smart server 14 (as will be described in more detail below with respect to the operation of smart server 14), then a secure communication link is established between smart server 14 and smart client device 28. Preferably, all communications between smart server 14 and smart client device 28 after validation of the identity of smart client device 28 are secured via an SSL connection. Of course, one skilled in the art will understand that other cryptographic protocols that provide communication security over the Internet could also be used. If the identity of smart client device 28 is not validated by smart server 14, then the method returns to step 82 described above.

In step 86, once smart client device 28 receives notification from smart server 14 that its identity has been validated, smart client device 28 publishes or transmits its agent list and the password that was entered by the user in the HTML form during deployment of smart client device 28 to smart server 14. In step 88, smart client device 28 periodically performs a watchdog process using a time period specified in the custom software. This time period may vary depending on available bandwidth between smart client device 28 and smart server 14 and/or the frequency at which the agent list changes. For example, if a particular implementation provides a higher bandwidth connection and the agent list changes frequently, the watchdog process may be performed every 30 seconds (i.e., close to real-time). However, if a particular implementation provides a lower bandwidth connection and the agent list does not change as often, the watchdog process may be performed every 600 seconds. Each time the watchdog process is performed, step 86 described above is performed so as to update the agent list on smart server 14.

As described above, network 10 can support a plurality of client networks each of which includes a smart client device (similar to smart client device 28) in communication with a plurality of agent devices (similar to agent devices 30). It should be understood that the methods described above in connection with FIGS. 2-4 would be performed for each smart client device in network 10.

Smart Server

In the exemplary embodiment, smart server 14 comprises any suitable computer hardware with custom software programmed to perform the methods described below in connection with FIGS. 5-6. In the exemplary embodiment, smart server 14 is an IP (Internet Protocol) capable device with custom software running a Linux operating system in an OpenWRT environment. Of course, one skilled in the art will understand that other types of devices and operating systems could be used in accordance with the present invention.

Smart server 14 includes a plurality of ports for communication with other devices. Each port is an Internet accessible port configured to connect for communication with a smart client device (such as smart client device 28) or a remote device (such as one of remote devices 16). In this embodiment, each Internet accessible port is configured to communicate via DHCP.

The custom software running on smart server 14 is preferably operable to perform the following functions: detection and validation of smart client devices (i.e., detect and validate the identity of one or more smart client devices requesting a connection with the smart server), communication with smart client devices (i.e., maintain an agent list and password for each smart client device), detection and validation of remote devices (i.e., detect one or more remote devices and validate the user-entered identity of a smart client device to which the user wants to establish a connection), presentment of available agent devices to remote devices for selection of an agent device (i.e., present a list of available agent devices to remote devices and receive a selection of an agent device), and communication between remote devices and agent devices (i.e., forward communications between remote devices and agent devices). Each of these functional capabilities will now be described in more detail with reference to an exemplary operation of smart server 14 in relation to a single smart client device (i.e., smart client device 28) and a single remote device (i.e., one of remote devices 16).

Figure 5:
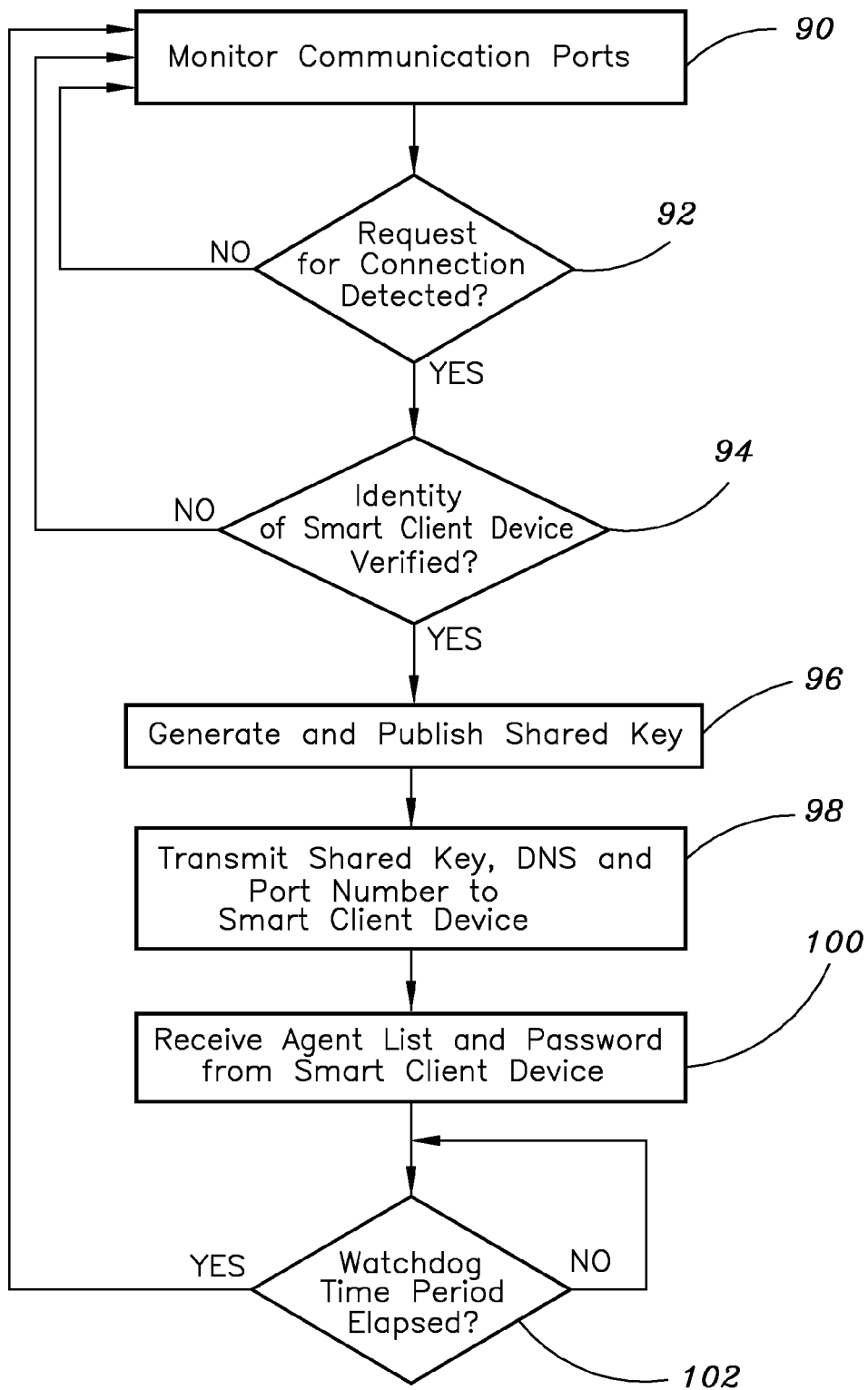
FIG. 5 is a flow diagram of an exemplary method in which a smart server establishes a secure communication link with a smart client device in accordance with the present invention.

Referring to FIG. 5, an exemplary method in which smart server 14 establishes a secure communication link with smart client device 28 is described with reference to steps 90-102. In step 90, smart server 14 monitors inbound communication traffic on ports 80/443 (i.e., the ports over which smart client device 28 may be attempting to establish communication). If smart server 14 does not detect any inbound communication in step 92, the method returns to step 90. If smart server 14 detects a request for connection, in step 94, it verifies the identity of the smart client device against a table of licensed connections (i.e., a list of authorized smart client devices). In this embodiment, smart server 14 verifies the X.509 identity of the smart client device by walking up the certificate chain. If the identity of the smart client device does not match any licensed connections, the smart client device will not be allowed to communicate further with smart server 14 and the method returns to step 90. However, in step 96, if the identity of the smart client device matches one of the licensed connections, smart server 14 generates a unique, random shared key in accordance with the Advanced Encryption Standard (AES) and publishes the shared key via inter-process communication (IPC) on the same host. In step 98, smart server 14 transmits the shared key along with its DNS identification and a port number for use in communication with smart server 14 to smart client device 28. As described above, all communications between smart server 14 and smart client device 28 after validation of the identity of smart client device 28 are preferably secured via a SSL connection. Of course, one skilled in the art will understand that other cryptographic protocols that provide communication security over the Internet could also be used.

In step 100, with a secure communication link established between smart server 14 and smart client device 28, smart server 14 receives an agent list and password from smart client device 28, as described above, and adds the agent list and password to its local server table in association with the identity of smart client device 28. In step 102, smart server 14 periodically performs a watchdog process in accordance with TCP/IP standards. Each time the watchdog process is performed, steps 90-100 described above are performed so as to dynamically update the information stored on smart server 14. Thus, the agent list stored on smart server 14 will be essentially as current as the agent list maintained by smart client device 28.

Figure 6:
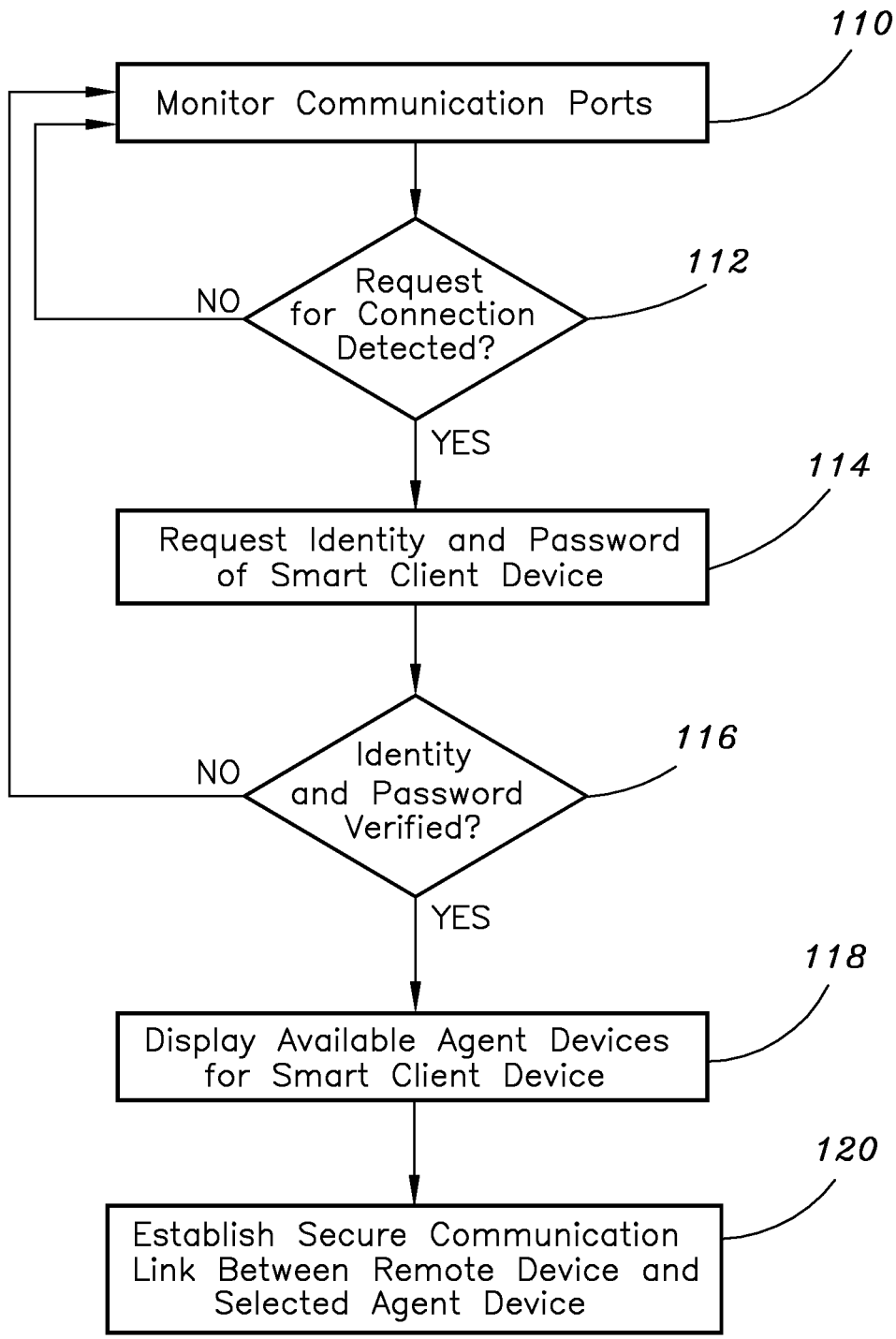
FIG. 6 is a flow diagram of an exemplary method in which a smart server proxies communications between a remote device and an agent device via the secure communication link established between the smart server and smart client device in accordance with the present invention.

Referring to FIG. 6, an exemplary method in which smart server 14 forwards communications from one of remote devices 16 to one of agent devices 30 via the secure communication link between smart server 14 and smart client device 28 is described with reference to steps 110-120. In step 110, smart server 14 monitors inbound communication traffic on port 443 (i.e., the port over which one of remote devices may be attempting to establish communication). If smart server 14 does not detect any inbound communication in step 112, the method returns to step 110. If smart server 14 detects a request for connection, in step 114, it presents a web interface requesting the user of remote device 16 to enter an identity of a smart client device (i.e., an identity of a smart client device to which the user wants to establish a connection) and a password (i.e., the password that was entered by the user in the HTML form during deployment of the smart client device).

In step 116, upon receipt of an identity and password from remote device 16, smart server 14 compares the identity and password against its local server table (i.e., the local server table that stores the identity, password and agent list for each smart client device). If the identity and password do not match any smart client devices in the local server table, remote client device 16 will not be allowed to communicate further with smart server 14 and the method returns to step 110. However, in step 118, if the identity and password match one of the smart client devices in the local server table, such as if the identity and password for smart client device 28 is received, smart server 14 presents a web interface that displays the available agent devices 30 associated with smart client device 28 (i.e., the agent devices included on the agent list).

In step 120, upon receipt of a selection of one of agent devices 30, smart server 14 establishes a secure communication link between remote device 16 and the selected agent device 30. In particular, smart server 14 proxies all requests from remote device 16 to the selected agent device 30 via the secure communication link between smart server 14 and smart client device 28, and likewise proxies all responses from the selected agent device 30 back to remote device 16 via the secure communication link between smart client device 28 and smart server 14. Thus, for example, if the selected agent device 30 is a controller for an HVAC&R system, the user of remote device 16 may query parameters of the HVAC&R system or change settings of the HVAC&R system just as if the user had direct access to the HVAC&R controller.

From the above description, it should be apparent that secure communication between one of remote devices 16 and one of agent devices 30 is enabled via the secure communication link established between smart client device 28 and smart server 14. This secure communication link is established essentially automatically and without complex configuration of firewall or network parameters by the user. The user need only perform a simple deployment process of smart client device 28 as described above. Thus, network 10 enables multi-point to multi-point communication, i.e., an essentially unlimited number of remote devices 16 can communicate with an essentially unlimited number of agent devices 30 located within an essentially unlimited number of client networks 12. In the exemplary embodiment, smart server 14 can support up to five hundred and twelve (512) concurrent connections. Further, smart client device 28 can be installed on any network so as to enable Internet access to all network devices such as agent devices 30.

While the present invention has been described and illustrated hereinabove with reference to an exemplary embodiment, it should be understood that various modifications could be made to this embodiment without departing from the scope of the invention. Therefore, the present invention is not to be limited to the specific network architecture or methodology of the exemplary embodiment, except insofar as such limitations are included in the following claims.

What is claimed and desired to be secured by Letters Patent is as follows:

1. A secure communication network, comprising:
   a plurality of local client networks each of which comprises a client device in communication with a plurality of agent devices, wherein the client device comprises an embedded IP (Internet Protocol) device;
   a server that communicates over a secure communication link with the client device of each of the local client networks, wherein the server stores an agent list for the client device of each of the local client networks, wherein each agent list comprises a list of available agent devices associated with the client device; and
   a plurality of remote devices in communication with the server;
   wherein the server receives from each of the remote devices a request to connect with one of the agent devices of one of the local client networks by (a) receiving an identity of a client device from the remote device, (b) displaying the agent list associated with the identified client device, and (c) receiving from the remote device a selection of one of the agent devices from the agent list, and, for each request, the server proxies all communications between the remote device and the selected agent device via the secure communication link between the server and the client device associated with the selected agent device.

2. A method of enabling secure communication between a plurality of remote devices and a plurality of agent devices located within a plurality of local client networks, comprising:
   causing a client device to be deployed within each local client network, wherein the client device comprises an embedded IP (Internet Protocol) device, wherein the client device is in communication with a plurality of agent devices within the local client network;
   using a server to:
   (1) establish a secure communication link with the client device of each local client network;
   (2) store an agent list for each client device, wherein each agent list comprises a list of available agent devices associated with the client device;
   (3) receive from each of the remote devices a request to connect with one of the agent devices of one of the local client networks by:
      (a) receiving an identity of a client device from the remote device;
      (b) displaying the agent list associated with the identified client device;
      (c) receiving from the remote device a selection of one of the agent devices from the agent list; and
   (4) for each request received in step (3), proxy all communications between the remote device and the selected agent device via the secure communication link between the server and the client device associated with the selected agent device.

3. A system that enables secure communication between a plurality of remote devices and a plurality of agent devices located within a plurality of local client networks, comprising:
   a plurality of client devices each of which is deployed within one of the local client networks for communication with a plurality of agent devices within that local client network, wherein each of the client devices comprises an embedded IP (Internet Protocol) device;
   a server operable to:
   (1) establish a secure communication link with each client device of each of the local client networks;
   (2) store an agent list for each of the client devices, wherein each agent list comprises a list of available agent devices associated with the client device;
   (3) receive from each of the remote devices a request to connect with one of the agent devices of one of the client networks by:
      (a) receiving an identity of one of the client devices from the remote device;
      (b) displaying the agent list associated with the identified client device;
      (c) receiving from the remote device a selection of one of the agent devices from the agent list, and
   (4) for each request received in step (3), proxy all communications between the remote device and the selected agent device via the secure communication link between the server and the client device associated with the selected agent device.

4. The system of claim 3, wherein each agent device comprises an IP (Internet Protocol) device.

5. The system of claim 4, wherein at least one of the agent devices comprises a controller for an embedded control system.

6. The system of claim 5, wherein the embedded control system comprises one of the following: a heating, ventilation, air conditioning and refrigeration (HVAC&R) system, an energy management system, a building automation system, an automotive system, a transportation system, a lighting control system, a security system, a surveillance system, an IP camera, and a kiosk.

7. The system of claim 3, wherein each client device includes (i) an Internet accessible port configured to connect for communication outside of the local client network, (ii) a port configured to connect to a management device, and (iii) a plurality of ports configured to connect to the agent devices of the local client network.

8. The system of claim 7, wherein the management device is operable to deploy the client device in the local client network.

9. The system of claim 8, wherein the client device presents an HTML form on the management device for entry of information, wherein the information entered into the HTML form includes one or more of a user-defined password, a plurality of user-defined port numbers of the agent devices, and a user-defined exceptions list that denotes any agent devices to be ignored.

10. The system of claim 9, wherein the client device maintains the agent list for the local client network.

11. The system of claim 10, wherein the client device maintains the agent list by periodically (i) scanning the user-defined port numbers of the agent devices to detect agent devices that acknowledge the scan, (ii) adding to the agent list the IP addresses of the agent devices that acknowledge the scan, and (iii) ignoring the agent devices on the user-defined exceptions list.

12. The system of claim 10, wherein the client device periodically transmits the agent list and the user-defined password to the server, and wherein the server stores the agent list and the user-defined password in association with the identity of the client device.

13. The system of claim 3, wherein the server is located outside each of the local client networks.

14. The system of claim 3, wherein each client device sends a request for connection to the server and, if the server validates the identity of the client device, the secure communication link is established between the client device and the server.

15. The system of claim 14, wherein the server validates the identity of the client device by comparing the identity of the client device to a list of authorized client devices.

16. The system of claim 3, wherein the server transmits to each client device a port number for use in communication with the server.

17. The system of claim 3, wherein all communications between each client device and the server are secured via a Secure Sockets Layer (SSL) connection.

18. The system of claim 3, wherein the client device transmits to the server a port number for use in communication with the remote devices connected to the server.

19. The system of claim 3, wherein the server includes a plurality of Internet accessible ports configured to connect for communication with each client device and each remote device.

20. The secure communication network of claim 3, wherein each remote device comprises a smart phone or a computer/tablet.

21. The system of claim 3, wherein each remote device submits to the server a request to connect with one of the agent devices of one of the local client networks by (i) accessing the server, (ii) providing the identity of the client device and a password, and (iii) selecting the agent device from the agent list associated with the client device.

22. The system of claim 21, wherein the server authenticates the identity of the client device and the password and presents a web interface that displays the agent list associated with the client device.

23. The system of claim 22, wherein the server proxies all requests from the remote device to the selected agent device via the secure communication link between the server and the client device, and proxies all responses from the selected agent device back to the remote device via the secure communication link between the client device and the server.

24. The system of claim 3, wherein the communications between the remote device and the selected agent device comprise port/application specific device communications.

* * * * *